(No Model.)

J. L. PADEN.
ATTACHMENT FOR CORN PLANTERS.

No. 333,247. Patented Dec. 29, 1885.

Witnesses:
C. D. Hudgens.
A. H. Orwig.

Inventor:
James L. Paden,
By Thomas G. Orwig, Atty

UNITED STATES PATENT OFFICE.

JAMES L. PADEN, OF LUCKY VALLEY, ASSIGNOR OF ONE-HALF TO JAMES KENT, OF CORRECTIONVILLE, IOWA.

ATTACHMENT FOR CORN-PLANTERS.

SPECIFICATION forming part of Letters Patent No. 333,247, dated December 29, 1885.

Application filed August 10, 1885. Serial No. 174,038. (No model.)

*To all whom it may concern:*

Be it known that I, JAMES L. PADEN, a citizen of the United States of America, and a resident of Lucky Valley, in the county of Woodbury and State of Iowa, have invented an Attachment for Corn-Planters, of which the following is a specification.

My invention consists in mechanism that can be readily applied to a planter to automatically operate the seed-slide at regular intervals of time and space as the machine is advanced across a field, and as required to produce check-rows.

Figure 1:
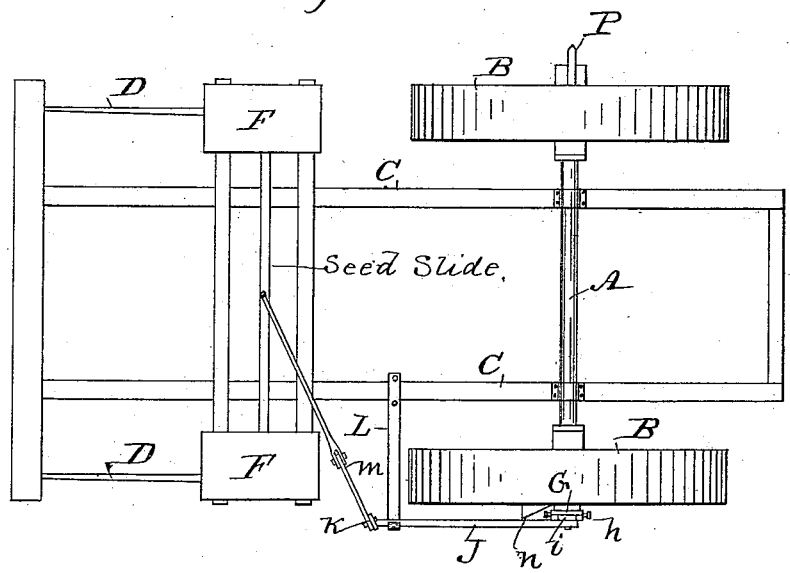
Figure 2:
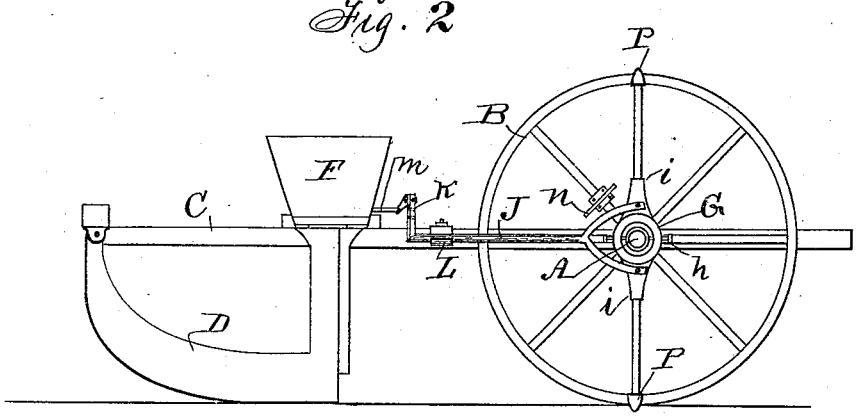

Figure 1 of the accompanying drawings is a top view, and Fig. 2 a side view, of a planter having my attachment applied as required for practical use.

A represents the carriage-axle, B B the wheels, C the frame, D D the runners, and F F the seed-boxes, of a corn-planter that may vary in form as desired.

G is a collar pivoted to the hub of one of the carriage-wheels, preferably on the outside, by means of set-screws h, or in any suitable way that will allow it to vibrate. i i are arms extending in opposite directions from the collar G.

J is a rock-shaft having a fork at its rear end, and a crank, k, at its front end. Its forked rear end strides the collar G and the ends of the branches of the fork are detachably fixed to the arms i by means of screw-bolts.

L represents a shaft-bearer fixed to the carriage-frame to support the rock-shaft J.

m represents a jointed connecting-rod, pivoted to the center of the seed-slide, and adjustably connected with the crank k on the end of the rock-shaft by means of a screw-bolt and perforations in the crank, as required, to regulate the length of the stroke of the seed-slide relative to the valves in the seed-boxes.

n is a triangular-shaped cam, clamped fast to one of the spokes of the wheel, by means of a plate and screw-bolts, in such a manner that it will come in contact with the end of each arm i at each revolution of the carriage-wheel, to thereby impart vibratory motions to the arms for the purpose of rocking the shaft J at regular intervals. As the shaft is thus rocked its crank k imparts a reciprocating motion to the seed-slide, as required, to drop seed simultaneously from the seed-boxes at regular intervals of space.

P P represent markers, attached to the rims of the wheels in such a manner that they will indent the surface of the ground, as required, to mark the rows for the purpose of directing the operator and aiding in keeping the rows equidistant and straight.

I am aware that a shaft having studs at its ends has been attached to a corn-planter carriage and connected with a seed-slide in such a manner that a stud fixed to a spoke in the wheel would come in contact with the studs on the shaft and actuate the shaft, as required, to operate the seed-slide; but my manner of constructing, arranging, and combining a collar, having arms, with a rock-shaft having a forked end to accomplish the results contemplated is novel and advantageous.

I claim as my invention—

The attachment for corn-planters, composed of a collar, G, having arms i, a rock-shaft, J, having a fork at its rear end and a crank, k, at its front end, a shaft-bearer, L, a connecting-rod, m, and a cam, n, substantially as shown and described, for the purpose specified.

JAMES L. PADEN.

Witnesses:
ALBERT BISSELL,
O. B. FRAZER.